(12) United States Patent
Chen et al.

(10) Patent No.: US 7,557,520 B2
(45) Date of Patent: Jul. 7, 2009

(54) LIGHT SOURCE DRIVING CIRCUIT

(75) Inventors: Bi-Hsien Chen, Pingtung County (TW); Han-Yu Chao, Tainan County (TW); Shin-Chang Lin, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 27 days.

(21) Appl. No.: 11/775,842

(22) Filed: Jul. 10, 2007

(65) Prior Publication Data

US 2008/0093997 A1 Apr. 24, 2008

(30) Foreign Application Priority Data

Oct. 18, 2006 (TW) .............................. 95138345 A (51) Int. Cl.
*H05B 37/02* (2006.01)

(52) U.S. Cl. ..................... 315/291; 315/224; 315/307

(58) Field of Classification Search ............. 315/209 R, 315/224, 246, 291, 299, 307–308, 185 R; 362/227, 230–231, 276, 800; 323/282, 284
See application file for complete search history.

(56) References Cited

U.S. PATENT DOCUMENTS

| 5,793,163 | A | 8/1998 | Okuda | |
|---|---|---|---|---|
| 6,097,159 | A | 8/2000 | Mogi et al. | |
| 6,400,101 | B1 | 6/2002 | Biebl et al. | |
| 6,963,175 | B2 * | 11/2005 | Archenhold et al. | ........ 315/291 |
| 7,102,339 | B1 * | 9/2006 | Ferguson | ................... 323/284 |
| 7,145,295 | B1 * | 12/2006 | Lee et al. | ..................... 315/291 |
| 7,420,335 | B2 * | 9/2008 | Robinson et al. | ............ 315/224 |
| 7,423,389 | B2 * | 9/2008 | Lee | ........................... 315/308 |
| 2004/0004446 | A1 * | 1/2004 | Liu | ............................ 315/224 |
| 2006/0022916 | A1 * | 2/2006 | Aiello | ......................... 345/82 |

FOREIGN PATENT DOCUMENTS

JP 2005-294758 10/2005

* cited by examiner

*Primary Examiner*—David Hung Vu
*Assistant Examiner*—Tung X Le
(74) *Attorney, Agent, or Firm*—Jianq Chyun IP Office (57) ABSTRACT

A light source driving circuit for driving a light-emitting element is provided. The light source driving circuit includes a power supply circuit, a dimming circuit, and a feedback circuit. A first terminal of the dimming circuit is connected to a terminal of the light-emitting element, and a second terminal of the dimming circuit receives a supply voltage output from the power supply circuit. The dimming circuit determines an ON/OFF state between the first terminal and the second terminal according to a logic state of a pulse width signal. The feedback circuit is connected between the first terminal of the dimming circuit and a feedback terminal of the power supply circuit. The feedback circuit controls a level of the supply voltage output from the power supply circuit according to the ON/OFF state of the dimming circuit.

28 Claims, 6 Drawing Sheets

LIGHT SOURCE DRIVING CIRCUIT

CROSS-REFERENCE TO RELATED APPLICATION

This application claims the priority benefit of Taiwan application Ser No. 95138345, filed Oct. 18, 2006. All disclosure of the Taiwan application is incorporated herein by reference.

BACKGROUND OF THE INVENTION

1. Field of the Invention

The present invention relates to a driving circuit. More particularly, the present invention relates to a light source driving circuit for driving a light-emitting element.

2. Description of Related Art

Light source driving circuits have been widely applied in various display devices, for example, backlight driving circuits of LCDs or LED driving circuits of handheld mobile devices. As display devices are increasingly used in various electronic products, the light source driving circuits have a great potential for development, and many advantageous features of the circuits, such as power conversion efficiency and stability, can be improved and enhanced continuously.

Figure 1:
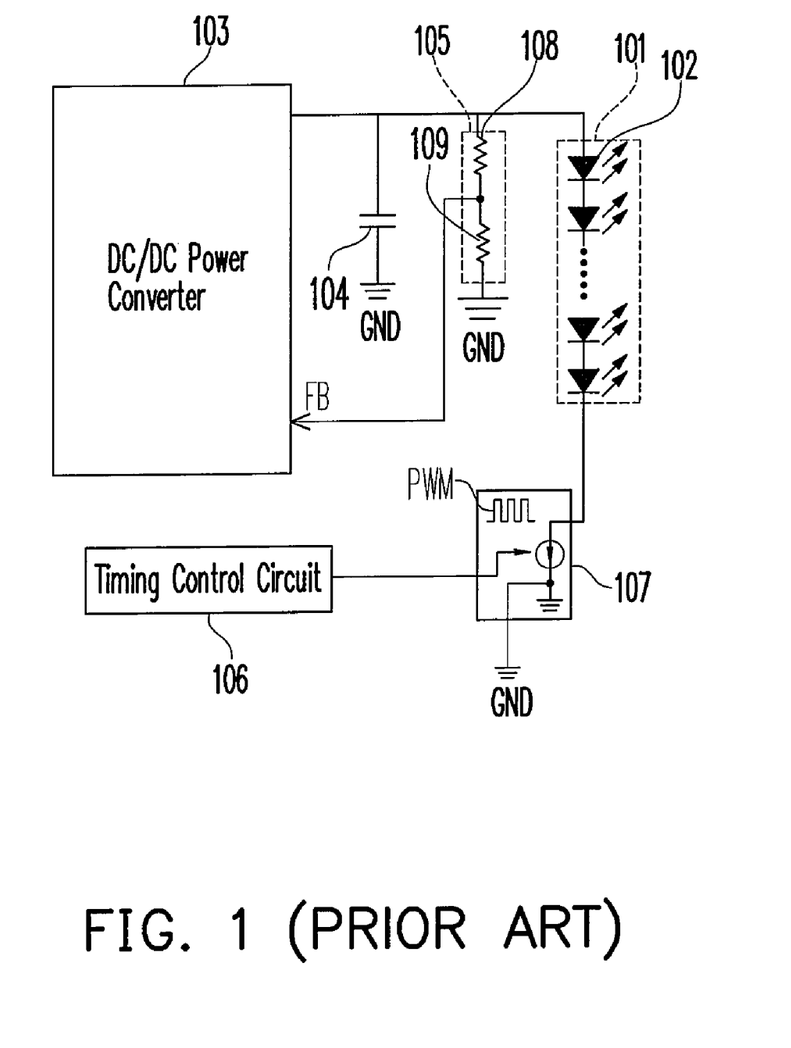
FIG. 1 shows the architecture of a conventional light source driving circuit.

The architecture of a conventional light source driving circuit for driving an LED string 101 is as shown in FIG. 1. The LED string 101 includes a plurality of LEDs 102 strung together. The conventional light source driving circuit includes a DC/DC power converter 103, a capacitor 104, an output voltage feedback circuit 105, a timing control circuit 106 and a dimming circuit 107. The dimming circuit 107 is connected between a cathode of the LED string 101 and a common potential GND, and receives a pulse width signal PWM output from the timing control circuit 106. In addition, the output voltage feedback circuit 105 is implemented by two resistors 108 and 109 connected in series.

The DC/DC power converter 103 supplies a DC supply voltage to the LED string 101, and performs a feedback control according to a feedback signal FB received by the output voltage feedback voltage 105, so as to stably output a DC supply voltage. The timing control circuit 106 determines the width of the output pulse width signal according to the luminance set by the user. The dimming circuit 107 is turned on as the pulse width signal is at a high level, and is turned off when it is at a low level. By adjusting the width of the pulse width signal, the ON/OFF state of the dimming circuit 107 can be controlled, so as to further control the LED string 101 to whether or not permit a current to pass through.

Thus, when the luminance is set to high, the time that the pulse width signal remains at the high level is long such that the turn-turn-on time of the dimming circuit 107 is long, and the luminance of the LED string 101 is high. On the contrary, when the luminance is set to low, the time that the pulse width signal remains at the high level is short, such that the turn-on time of the dimming circuit 107 is short, and the luminance of the LED string 101 is low.

However, as the pulse width signal is at the low level, the dimming circuit 107 is turned off (i.e., the electrical path between the cathode of the LED string 101 and the common potential GND is turned off), and at this time, the voltage drop of the DC supply voltage supplied by the DC/DC power converter 103 completely falls on the dimming circuit 107. When the LED string 101 includes lots of LEDs 102 connected in series, the DC supply voltage supplied by the DC/DC power converter 103 will have a high voltage value.

Under this circumstance, if the withstand voltage of the dimming circuit 107 is not high enough, the dimming circuit 107 will be damaged by the DC supply voltage supplied by the DC/DC power converter 103. Moreover, the dimming circuit 107 with a higher voltage tolerancecan be used. However, the dimming circuit 107 with the higher voltage tolerance requires larger space and has a higher price, which not only increases the volume of the entire circuit, but also increases the cost of the circuit. Thus, the market competitiveness of this product is reduced.

SUMMARY OF THE INVENTION

The present invention is directed to a light source driving circuit for reducing a voltage of a dimming circuit, so as to reduce the possibility of damage to the dimming circuit by an overly high voltage and to prolong the service life of the light source driving circuit.

The present invention is directed to a light source driving circuit for reducing the cost of the internal components of the light source driving circuit so as to improve the competition force of the product.

As embodied and broadly described herein, the present invention provides a light source driving circuit for driving a light-emitting element, wherein a terminal of the light-emitting element is connected to a first voltage. The light source driving circuit comprises a dimming circuit, a power supply circuit, and a feedback circuit. The dimming circuit has a first terminal, a second terminal and a pulse width signal input terminal, wherein the first terminal is connected to another terminal of the light-emitting element, and the pulse width signal input terminal receives a pulse width signal. The dimming circuit determines an ON/OFF state between the first terminal and the second terminal according to a logic state of the pulse width signal.

The power supply circuit comprises an output terminal and a feedback terminal. The output terminal is connected to the second terminal of the dimming circuit, so as to supply a second voltage to the second terminal of the dimming circuit, and the power supply circuit determines a value of the second voltage according to a feedback signal received by the feedback terminal, wherein the second voltage is lower than the first voltage. The feedback circuit is connected between the first terminal of the dimming circuit and the feedback terminal of the power supply circuit, so as to determine a value of the feedback signal according to an ON/OFF state of the dimming circuit.

According a preferred embodiment of the present invention, the above feedback circuit comprises a detecting circuit and a feedback voltage control circuit. The detecting circuit includes a first terminal, a second terminal, and an output terminal, wherein the first terminal is connected to the first terminal of the dimming circuit, and the second terminal is connected to a common potential to determine a level of the voltage output from the output terminal of the detecting circuit according to an impedance between the first terminal of the detecting circuit and the second terminal of the detecting circuit. An input terminal of the feedback voltage control circuit is connected to the output terminal of the detecting circuit, and an output terminal of the feedback voltage control circuit outputs the feedback signal to control a voltage value of the feedback signal according to the level of the voltage output from the output terminal of the detecting circuit.

According to a preferred embodiment of the present invention, the detecting circuit comprises a first impedance element and a second impedance element. A terminal of the first impedance element is the first terminal of the detecting circuit, and the other terminal is the output terminal of the detecting circuit. A terminal of the second impedance element is connected to another terminal of the first impedance element, and the other terminal is the second terminal of the detecting circuit.

According to a preferred embodiment of the present invention, the above feedback voltage control circuit comprises an operational amplifier, which includes a first input terminal, a second input terminal, and an output terminal, wherein the first input terminal is connected to the output terminal of the detecting circuit, the second input terminal is connected to a reference voltage, and the output terminal is connected to the feedback terminal of the power supply circuit. In this embodiment, the feedback voltage control circuit further comprises a first diode and a third impedance element. A cathode of the first diode is connected to the output terminal of the operational amplifier, and an anode of the first diode is connected to the feedback terminal of the power supply circuit. The third impedance element is connected between the cathode of the first diode and the output terminal of the operational amplifier.

According a preferred embodiment of the present invention, the above feedback circuit further comprises an output voltage feedback circuit. The output voltage feedback circuit is connected between the output terminal of the power supply circuit and the feedback terminal of the power supply circuit, for determining a voltage value of the feedback signal according to the second voltage. In this embodiment, the output voltage feedback circuit comprises a fourth impedance element and a fifth impedance element. A terminal of the fourth impedance element is connected to the output terminal of the power supply circuit, and the other terminal is connected to the feedback terminal of the power supply circuit. A terminal of the fifth impedance element is connected to another terminal of the fourth impedance element, and the other terminal is connected to the common potential.

The light source driving circuit according to a preferred embodiment of the present invention further comprises a timing control circuit. The timing control circuit is connected to the pulse width signal input terminal of the dimming circuit for converting a luminance setting input by a user into a pulse width signal.

The light source driving circuit according to a preferred embodiment of the present invention further comprises a level raising circuit. The level raising circuit is connected between the timing control circuit and the pulse width input terminal of the dimming circuit for receiving the pulse width signal output from the timing control circuit, raising the voltage level of the pulse width signal and outputting the pulse width signal.

The light source driving circuit of the present invention uses the second terminal (i.e., a ground terminal) of the dimming circuit to receive a supply voltage, and adaptively adjusts the level of the supply voltage according to the ON/OFF state of the dimming circuit, so as to reduce the voltage on the dimming circuit such that the possibility of breaking down of the dimming circuit caused by an over high voltage is reduced. Thus, the present invention reduces the possibility of damage of internal components of the light source driving circuit and prolongs the life of the light source driving circuit. Moreover, the dimming circuit with a high withstand voltage is not required in the light source driving circuit, which reduces the cost of the internal components of the light source driving circuit, and improves the competitiveness of the product.

In order to make the aforementioned and other objects, features and advantages of the present invention comprehensible, preferred embodiments accompanied with figures is described in detail below.

DESCRIPTION OF EMBODIMENTS

Figure 2:
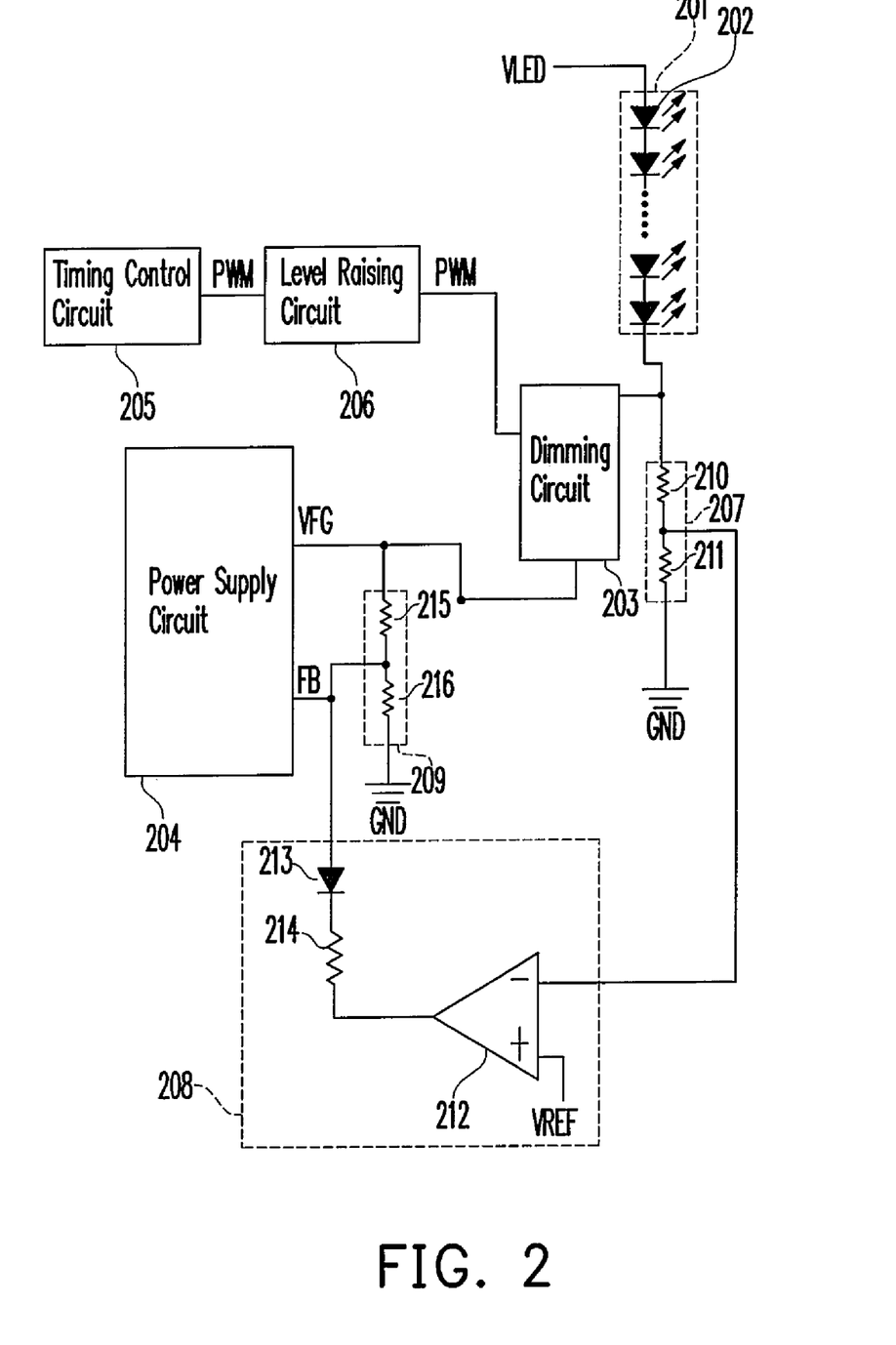
FIG. 2 is a circuit diagram of the light source driving circuit according to an embodiment of the present invention.

FIG. 2 is a circuit diagram of the light source driving circuit according to an embodiment of the present invention. Referring to FIG. 2, the light source driving circuit is used for driving a light-emitting element 201 having a terminal connected to a first voltage VLED. The light-emitting element 201 may be an LED 202 as shown in FIG. 2, or may be an LED string including a plurality of LEDs 202 strung together, or light-emitting elements or light-emitting element strings of other types. The light source driving circuit includes a dimming circuit 203, a power supply circuit 204, and a feedback circuit.

The dimming circuit 203 has a first terminal, a second terminal (i.e., a ground terminal of the dimming circuit), and a pulse width input terminal. The first terminal is connected to the other terminal of the light-emitting element 201, and the pulse width signal input terminal receives a pulse width signal PWM. The dimming circuit 203 determines an ON/OFF state between the first terminal and the second terminal according to a logic state of the pulse width signal PWM. In this embodiment, when the pulse width signal is in a high logic (high level) state, the electrical path (which can be regarded as a channel) between the first terminal and the second terminal of the dimming circuit 203 is turned on; otherwise, the electrical path is turned off.

When the luminance is set to high, the time that the pulse width signal PWM remains at the high level is long such that the turn-on time of the dimming circuit 203 is long, and the luminance of the LED string 201 is high. On the contrary, when the luminance is set to low, the time that the pulse width signal PWM remaining at the high level is short such that the turn-on time of the dimming circuit 203 is short and the luminance of the LED string 201 is low.

In this embodiment, the pulse width signal PWM is provided by the timing control circuit 205. The timing control circuit 205 is used to convert the luminance setting input by a user into the pulse width signal PWM. Moreover, in this embodiment, a level raising circuit 206 is further disposed between the timing control circuit 205 and the pulse width signal input terminal of the dimming circuit 203. The level raising circuit 206 is used to receive the pulse width signal PWM output from the timing control circuit 205, raise the voltage level of the pulse width signal PWM, and then output the pulse width signal PWM to the pulse width signal input terminal of the dimming circuit 203. However, the level raising circuit 206 is used for raising the voltage level of the pulse width signal PWM, and the user can use or not use the circuit according to actual requirements.

The power supply circuit 204 has an input terminal and a feedback terminal. The input terminal is connected to the second terminal of the dimming circuit 203, so as to provide a second voltage VFG to the second terminal of the dimming circuit 203, thereby raising the voltage level received by the second terminal of the dimming circuit 203. The power supply circuit 204 determines a value of the second voltage VFG according to a feedback signal FB received by the feedback terminal. In the present invention, the second voltage VFG is lower than the first voltage VLED. The feedback circuit is connected between the first terminal of the dimming circuit 203 and the feedback terminal of the power supply circuit 204, so as to determine a value of the feedback signal FB according to the ON/OFF state of the first dimming circuit 203.

In this embodiment, the feedback circuit includes a detecting circuit 207, a feedback voltage control circuit 208, and an output voltage feedback circuit 209. The detecting circuit 207 includes a first terminal, a second terminal, and an output terminal. The first terminal is connected to the first terminal of the dimming circuit 203, and the second terminal is connected to a common potential GND, so as to determine a level of the voltage output from the output terminal of the detecting circuit 207 according to an impedance between the first terminal of the detecting circuit 207 and the second terminal of the detecting circuit 207.

An input terminal of the feedback voltage control circuit 208 is connected to the output terminal of the detecting circuit 207, and an output terminal of the feedback voltage control circuit 208 outputs the feedback signal FB, so as to control the voltage value of the feedback signal FB according to the level of the voltage output from the output terminal of the detecting circuit 207. The output voltage feedback circuit 209 is connected between the output terminal of the power supply circuit 204 and the feedback terminal of the power supply circuit 204, so as to determine the voltage value of the feedback signal FB according to the second voltage VFG.

The detecting circuit 207 includes a first impedance element and a second impedance element. A terminal of the first impedance element is the first terminal of the detecting circuit 207, and the other terminal is the output terminal of the detecting circuit 207. A terminal of the second impedance element is connected to the other terminal of the first impedance element, and the other terminal is the second terminal of the detecting circuit 207. In this embodiment, the first impedance element and the second impedance element are implemented by resistors 210 and 211 respectively.

The feedback voltage control circuit 208 includes an operational amplifier 212, a diode 213, and a third impedance element. The operational amplifier 212 includes a first input terminal, a second input terminal, and an output terminal. The first input terminal is connected to the output terminal of the detecting circuit 207, and the second input terminal is connected to a reference voltage VREF. The third impedance element is connected between the output terminal of the operational amplifier 212 and a cathode of the first diode 213. An anode of the diode 213 is connected to the feedback terminal of the power supply circuit 204. In this embodiment, the third impedance element is implemented by a resistor 214, the first input terminal of the operational amplifier 212 is a negative input terminal, and the second input terminal of the operational amplifier 212 is a positive input terminal.

The output voltage feedback circuit 209 includes a fourth impedance element and a fifth impedance element. A terminal of the fourth impedance element is connected to the output terminal of the power supply circuit 204, and the other terminal is connected to the feedback terminal of the power supply circuit 204. A terminal of the fifth impedance element is connected to the other terminal of the fourth impedance element, and the other terminal is connected to the common potential GND. In this embodiment, the fourth impedance element and the fifth impedance element are implemented by resistors 215 and 216 respectively.

When the pulse width signal PWM is in the low logic state, the light-emitting element 201 is turned off, and the voltage on the first terminal of the dimming circuit 203 is increased. However, before the voltage on the first terminal of the dimming circuit 203 reaches the maximum voltage tolerance of the dimming circuit 203, the divided voltage on the resistor 211 in the detecting circuit 207 is greater than the reference voltage VREF received by the operational amplifier 212. Therefore, the output of the operational amplifier 212 is in the low logic state (the output ground voltage in this embodiment), and the diode 213 is turned on, such that the resistor 214 and the resistor 216 are connected in parallel. Thus, the feedback signal received by the feedback terminal of the power supply circuit 204 becomes lower, and further the power supply circuit 204 raises the level of the second voltage VFG output from the output terminal thereof according to the feedback mechanism.

Accordingly, the value of the voltage on the first terminal of the dimming circuit 203 becomes equal to the first voltage VLED minus the second voltage VFG. Thus, the dimming circuit 203 will not break down due to an overly high first voltage VLED.

When the pulse width signal PWM is in the high logic state, the light-emitting element 201 is turned on. At this time, the divided voltage value on the resistor 211 in the detecting circuit 207 is smaller than the voltage value of the reference voltage VREF received by the operational amplifier 212. Therefore, the output of the operational amplifier 212 is in the high logic state, and the diode 213 is turned off. The feedback signal received by the feedback terminal of the power supply circuit 204 is the divided voltage on the resistor 209, and further the power supply circuit 204 outputs the second voltage VFG at a normal level according to the feedback mechanism.

Therefore, the second voltage VFG output from the power supply circuit 204 as the pulse width signal PWM is in the high logic state is lower than the second voltage VFG output from the power supply circuit 204 as the pulse width signal PWM is in the low logic state, which satisfies the requirement that the dimming circuit 203 needs a second voltage at a higher level as the pulse width signal PWM is in the low logic state to reduce the voltage difference between the first terminal and the second terminal of the dimming circuit 203. Therefore, the dimming circuit 203 can be well protected from being broken down by the over high first voltage VLED at this time. The operation described above can also be regarded as coupling the second terminal (i.e., the ground terminal) of the dimming circuit 203 to a floating ground level.

Figure 3:
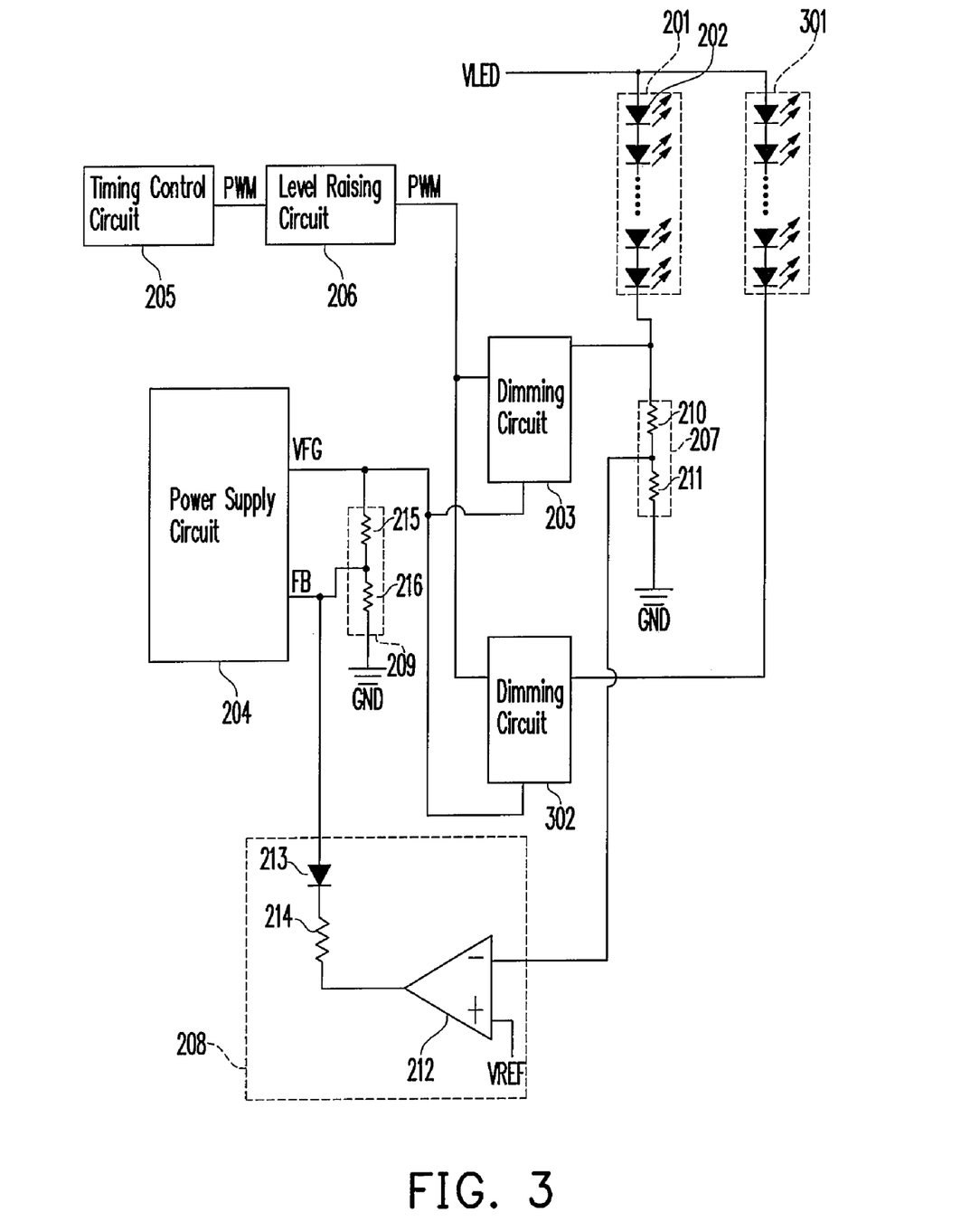
FIGS. 3, 4, 5, and 6 are circuit diagrams of the light source driving circuit according to another embodiment of the present invention respectively.

According to the teaching of the embodiment of FIG. 2, the present invention can use a plurality of dimming circuits in the light source driving circuit, so as to drive a plurality of light-emitting elements. As shown in FIG. 3, a light source driving circuit for driving two light-emitting elements is taken as an example to illustrate the present invention below.

FIG. 3 is a circuit diagram of the light source driving circuit according to another embodiment of the present invention. Referring to FIGS. 2 and 3, the difference between FIGS. 2 and 3 will be illustrated below. The circuit of FIG. 3 includes a light-emitting element 301 and a dimming circuit 302 in addition to the circuit of FIG. 2, so as to form one light source driving circuit for driving two light-emitting elements. The light-emitting element 301 can be the same as the light-emitting element 201, and the function and the operating mode of the dimming circuit 302 are also the same as those of the dimming circuit 203. Compared with FIG. 2, the light-emitting element 301 and the dimming circuit 302 are added in the circuit in FIG. 3, so the operating principle of the circuit of FIG. 3 is the same as that of the circuit of FIG. 2, and will not be described herein again. However, those of ordinary skill in the art can easily deduce that the example of FIG. 3 can also be implemented by a plurality of light-emitting element sets and a plurality of dimming circuit sets.

Figure 4:
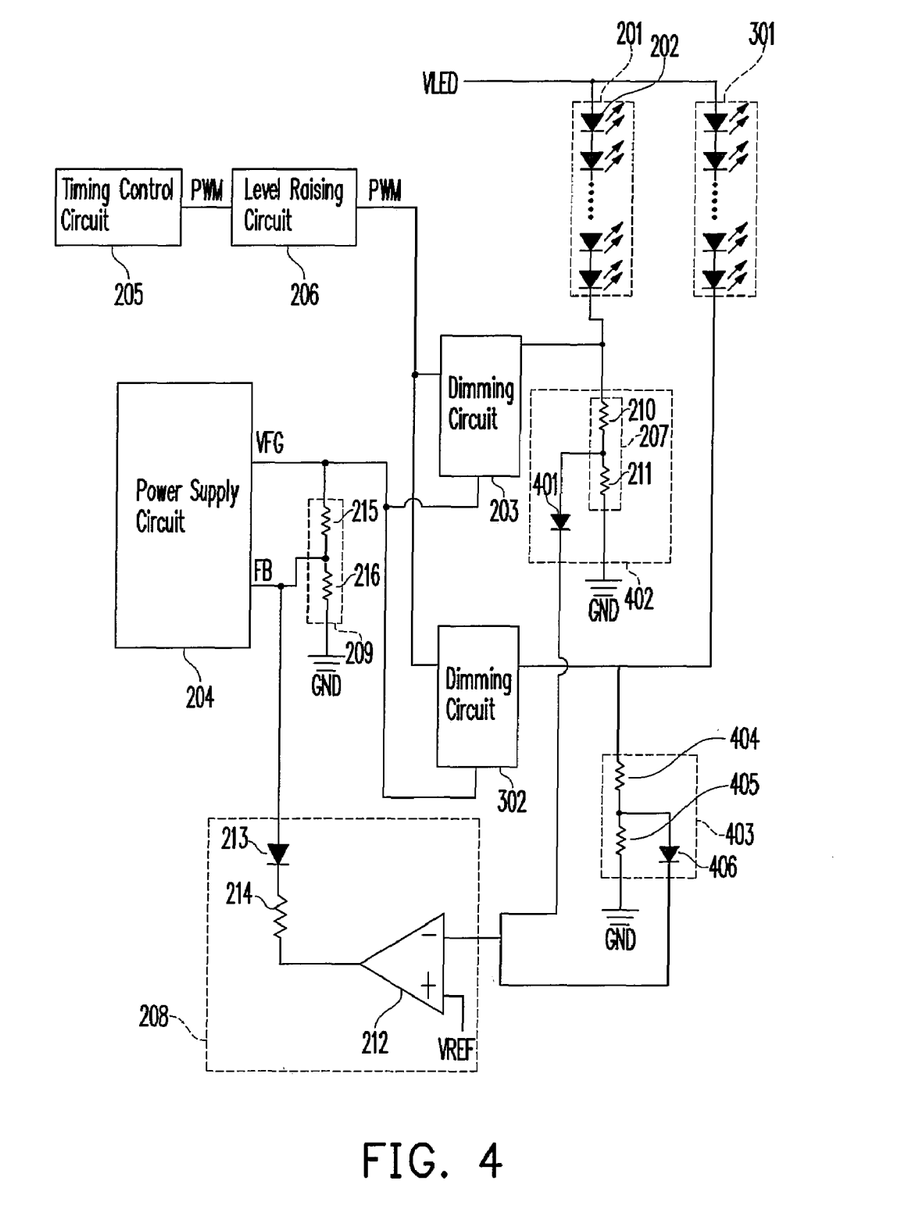

The circuit of FIG. 3 performs the voltage feedback on the dimming circuit 203 by using the detecting circuit 207 only. However, the user can perform the voltage feedback on all the dimming circuits of the present invention, such that the feedback voltage control circuit 208 controls the voltage value of the feedback signal FB according to the ON/OFF state of each of the dimming circuits, so as to adjust the level of the second voltage output from the power supply circuit 204. As shown in FIG. 4, another light source driving circuit for driving two light-emitting elements is taken as an example to illustrate another embodiment of the present invention below.

FIG. 4 is a circuit diagram of the light source driving circuit according to another embodiment of the present invention. Referring to FIGS. 3 and 4, the difference between FIGS. 3 and 4 will be illustrated below. The circuit of FIG. 4 includes a diode 401 in addition to the detecting circuit 207 of FIG. 3, so as to form a detecting circuit 402. Moreover, the circuit of FIG. 4 further includes one detecting circuit 403 having the same functions as the detecting circuit 402, wherein the detecting circuit 403 includes resistors 404, 405, and a diode 406. As such, the feedback voltage control circuit 208 can control the voltage value of the feedback signal FB according to the level of the voltage output from the output terminal of the detecting circuit 402 and the level of the voltage output from the output terminal of the detecting circuit 403, thus adjusting the level of the second voltage output from the power supply circuit 204.

The circuit of FIG. 4 can be regarded as an implementation form derived from the circuit of FIG. 3. Compared to the circuit of FIG. 3, the circuit of FIG. 4 performs an additional voltage feedback on the first terminal of the dimming circuit 302. Therefore, the operating principle of the circuit of FIG. 4 is the same as that of the circuit of FIG. 2, and will not be described herein again. However, those of ordinary skill in the art can easily deduce that the example of FIG. 4 can also be implemented by a plurality of light-emitting element sets and a plurality of dimming circuit sets.

Figure 5:
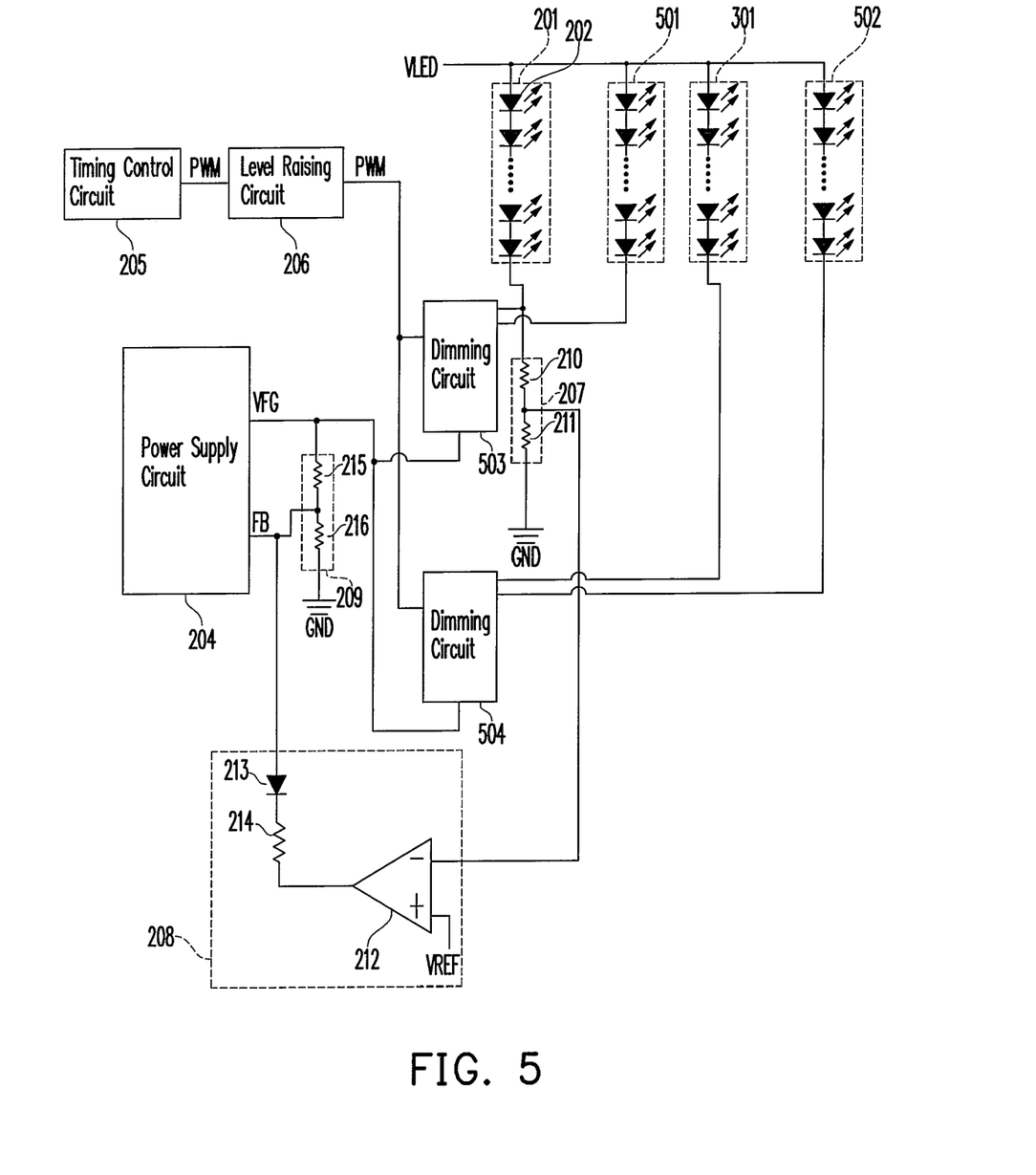

According to the teaching of the embodiment of FIG. 3, in the present invention, the dimming circuits 203 and 302 of FIG. 3 can be changed into dimming circuits with a plurality of input terminals (i.e., with a plurality of channels), such that each of the dimming circuits can drive a plurality of light-emitting elements simultaneously. As shown in FIG. 5, a light source driving circuit for driving four light-emitting elements is taken as an example to illustrate the present invention below.

FIG. 5 is a circuit diagram of the light source driving circuit according to another embodiment of the present invention. Referring to FIGS. 3 and 5, the difference between light source driving circuits shown in FIGS. 3 and 5 will be illustrated below. The light source driving circuit of FIG. 5 is used for driving a light-emitting element 201, a light-emitting element 301, a light-emitting element 501 and a light-emitting element 502. As shown in FIG. 5, the dimming circuit 503 comprises a first terminal, a second terminal, a third terminal and a pulse width signal input terminal and the dimming circuit 504 comprises a first terminal, a second terminal, a third terminal, and a pulse width signal input terminal.

The first terminal of the dimming circuit 503 is connected to the light-emitting element 201, the second terminal of the dimming circuit 503 is connected to the common potential GND, the third terminal of the dimming circuit 503 is connected to the light-emitting element 501, and the pulse width signal input terminal of the dimming circuit 503 receives the pulse width signal PWM. The first terminal of the dimming circuit 504 is connected to the light-emitting element 301, the second terminal of the dimming circuit 504 is connected to the common potential GND, the third terminal of the dimming circuit 504 is connected to the light-emitting element 502, and the pulse width signal input terminal of the dimming circuit 504 receives the pulse width signal PWM.

Each of the dimming circuit 503 and the dimming circuit 504 determines the ON/OFF state between the first terminal and the second terminal and the ON/OFF state between the third terminal and the second terminal according to the logic state of the pulse width signal PWM. In this embodiment, when the pulse width signal is in the high logic state (at the high level), the electrical path between the first terminal and the second terminal of the dimming circuit 503 and the electrical path between the third terminal and the second terminal of the dimming circuit 503 are turned on, and the electrical path between the first terminal and the second terminal of the dimming circuit 504 and the electrical path between the third terminal and the second terminal of the dimming circuit 504 are also turned on; otherwise, the electrical paths are turned off.

The circuit of FIG. 5 can be regarded as an implementation form derived from the circuit of FIG. 3. Compared with the light source driving circuit of FIG. 3, the light source driving circuit of FIG. 5 only changes the original dimming circuits of FIG. 3 into dimming circuits having a plurality of input terminals. Therefore, the operating principle of the circuit of FIG. 5 is the same as that of the circuit of FIG. 2, and will not be described herein again. However, those of ordinary skill in the art can easily deduce that the example of FIG. 5 can also be implemented by a plurality of light-emitting element sets and a plurality of dimming circuit sets having a plurality of input terminals. In addition, the example of FIG. 5 can also be implemented by a single dimming circuit having a plurality of input terminals and a plurality of light-emitting element sets.

Figure 6:
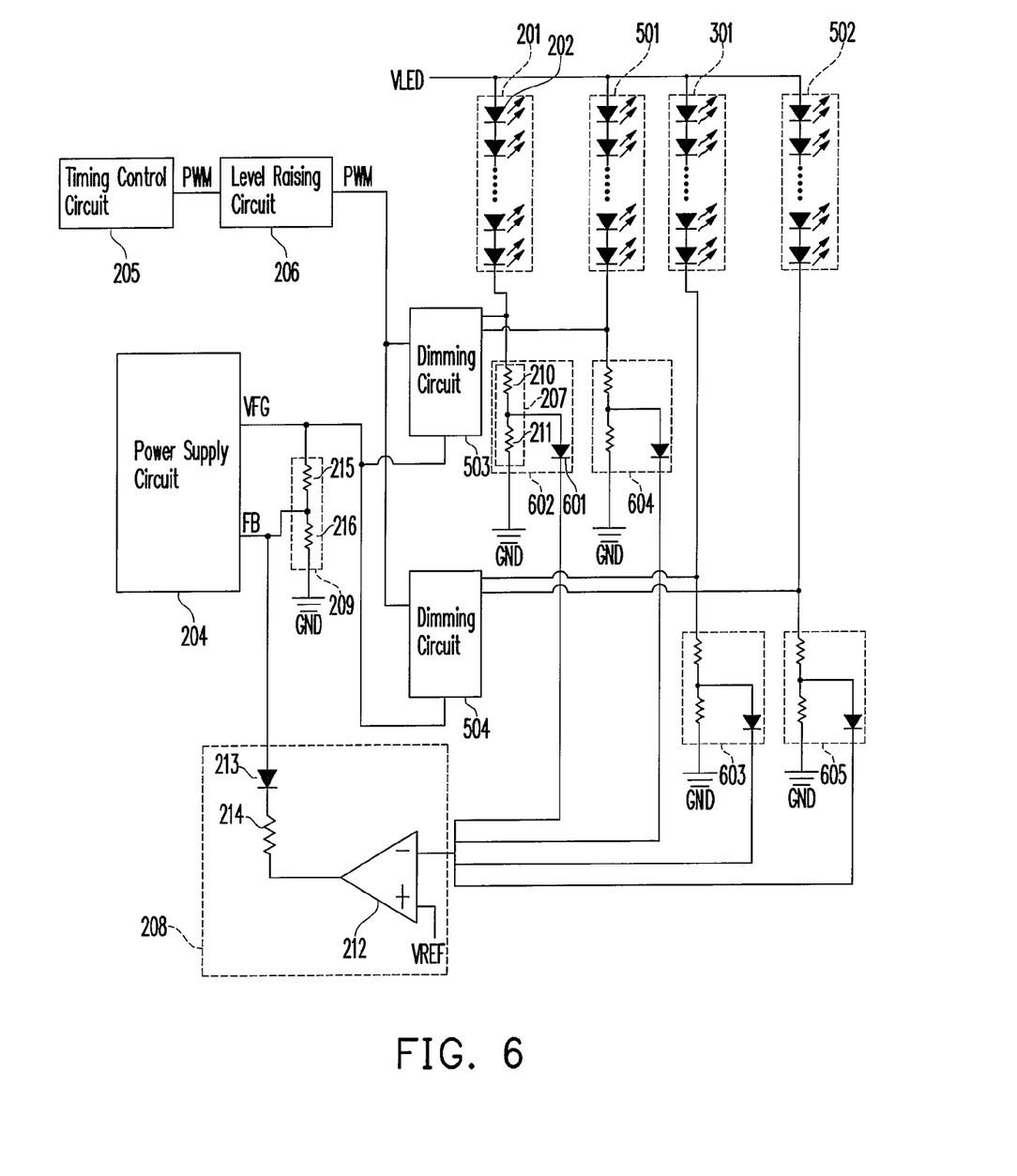

According to the teaching of the embodiments of FIGS. 4 and 5, the user can also perform the voltage feedback on the first terminals and the third terminals of the dimming circuits 503 and 504, as shown in FIG. 6.

FIG. 6 is a circuit diagram of the light source driving circuit according to another embodiment of the present invention. Referring to FIGS. 5 and 6, the difference between FIGS. 5 and 6 will be illustrated below. The circuit of FIG. 6 includes one diode 601 in addition to the detecting circuit 207 of FIG. 5, so as to form a detecting circuit 602. Moreover, the circuit of FIG. 6 includes three detecting circuits 603, 604, and 605 having the same function and structure as the detecting circuit 602.

A first terminal of the detecting circuit 603 is connected to the first terminal of the dimming circuit 504, a second terminal of the detecting circuit 603 is connected to the common potential GND, and an output terminal of the detecting circuit 603 is connected to the first input terminal of the operational amplifier 212. A first terminal of the detecting circuit 604 is connected to the third terminal of the dimming circuit 503, a second terminal of the detecting circuit 604 is connected to the common potential GND, and an output terminal of the detecting circuit 604 is connected to the first input terminal of the operational amplifier 212. A first terminal of the detecting circuit 605 is connected to the third terminal of the dimming circuit 504, a second terminal of the detecting circuit 605 is connected to the common potential GND, and an output terminal of the detecting circuit 605 is connected to the first input terminal of the operational amplifier 212.

As such, the feedback voltage control circuit 208 can control the voltage value of the feedback signal FB according to the level of the voltage output from the output terminal of the detecting circuit 602, the level of the voltage output from the output terminal of the detecting circuit 603, the level of the voltage output from the output terminal of the detecting circuit 604, and the level of the voltage output from the output terminal of the detecting circuit 605, and further adjusts the level of the second voltage output from the power supply circuit 204.

The circuit of FIG. 6 can be regarded as an of implementation form derived from the circuit of FIG. 5. Compared with the circuit of FIG. 5, the circuit of FIG. 6 only performs additional voltage feedback on the first terminal and the third terminal of the dimming circuit 503 and on the first terminal and the third terminal of the dimming circuit 504. Therefore, the operating principle of the circuit of FIG. 6 is the same as that of the circuit of FIG. 2, and will not be described herein again. However, those of ordinary skill in the art can easily deduce that the example of FIG. 6 can also be implemented by a plurality of light-emitting element sets and a plurality of dimming circuit sets having a plurality of input terminals.

Though the above embodiments provide various possible implementation forms of the light source driving circuit, those of ordinary skill in the art can understand that different manufacturers design the light source driving circuits differently. Therefore, a design is in conformity with the scope of the present invention, as long as the second terminals (i.e., the ground terminals) of the dimming circuits receive a supply voltage, and the level of the supply voltage is adaptively adjusted according to the ON/OFF states of the dimming circuits to reduce the voltage on the dimming circuits, and to reduce the possibility of the breakdown of the dimming circuits caused by overly high voltages.

It should be noticed that the power supply circuits in the aforementioned embodiments are not limited to a specific type of power supply circuits. The buck, boost, and buck-boost power supply circuits, various topologies, such as forward, flyback, semi-bridge, and full-bridge, derived from the aforementioned power supply circuits, or linear voltage regulators can all be used to implement the embodiments of the present invention.

The light source driving circuit of the present invention uses the second terminal (i.e., a ground terminal) of the dimming circuit to receive a supply voltage, and adaptively adjusts the level of the supply voltage according to the ON/OFF state of the dimming circuit, so as to reduce the voltage on the dimming circuit and reduce the possibility of the breakdown of the dimming circuit caused by an overly high voltage. Thus, the present invention prevents the damage of internal components of the light source driving circuit, and prolongs the service life of the light source driving circuit. Moreover, the dimming circuit with a high withstand voltage is not required in the light source driving circuit, which reduces the cost of the internal components of the light source driving circuit and improves the competitiveness of the product.

It will be apparent to persons of ordinary art in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source driving circuit, for driving a first light-emitting element, wherein a terminal of the first light-emitting element is connected to a first voltage, the light source driving circuit comprising:

a first dimming circuit, having a first terminal, a second terminal and a pulse width signal input terminal, wherein the first terminal is connected to another terminal of the first light-emitting element, and the pulse width signal input terminal receives a pulse width signal, and the first dimming circuit determines an ON/OFF state between the first terminal and the second terminal according to a logic state of the pulse width signal;

a power supply circuit, having an output terminal and a feedback terminal, wherein the output terminal is connected to the second terminal of the first dimming circuit, so as to supply a second voltage to the second terminal of the first dimming circuit, and the power supply circuit determines a value of the second voltage according to a feedback signal received by the feedback terminal, wherein the second voltage is lower than the first voltage; and a feedback circuit, connected between the first terminal of the first dimming circuit and the feedback terminal of the power supply circuit, so as to determine a value of the feedback signal according to the ON/OFF state of the first dimming circuit.

2. The light source driving circuit as claimed in claim 1, wherein the feedback circuit further comprises an output terminal connected to the power supply circuit for determining the value of the feedback signal according to the second voltage.

3. The light source driving circuit as claimed in claim 1, wherein the feedback circuit comprises:

a detecting circuit, having a first terminal, a second terminal and an output terminal, wherein the first terminal is connected to the first terminal of the first dimming circuit, and the second terminal is connected to a common potential, so as to determine a level of the voltage output from the output terminal of the detecting circuit according to an impedance between the first terminal of the detecting circuit and the second terminal of the detecting circuit; and a feedback voltage control circuit, comprising an input terminal connected to the output terminal of the detecting circuit and an output terminal for outputting the feedback signal, so as to control a voltage value of the feedback signal according to the level of the voltage output from the output terminal of the detecting circuit.

4. The light source driving circuit as claimed in claim 3, wherein the detecting circuit comprises:

a first impedance element, comprising a terminal serving as the first terminal of the detecting circuit and another terminal serving as the output terminal of the detecting circuit; and a second impedance element, comprising a terminal connected to the another terminal of the first impedance element and another terminal thereof serving as the second terminal of the detecting circuit.

5. The light source driving circuit as claimed in claim 4, wherein the first impedance element and the second impedance element respectively comprise a resistor.

6. The light source driving circuit as claimed in claim 3, wherein the feedback voltage control circuit comprises:

an operational amplifier, having a first input terminal, a second input terminal and an output terminal, wherein the first input terminal is connected to the output terminal of the detecting circuit, the second input terminal is connected to a reference voltage and the output terminal is connected to the feedback terminal of the power supply circuit.

7. The light source driving circuit as claimed in claim 6, wherein the feedback voltage control circuit further comprises:
a first diode, comprising a cathode connected to the output terminal of the operational amplifier and an anode connected to the feedback terminal of the power supply circuit.

8. The light source driving circuit as claimed in claim 7, wherein the feedback voltage control circuit further comprises:
a third impedance element, connected between the cathode of the first diode and the output terminal of the operational amplifier.

9. The light source driving circuit as claimed in claim 8, wherein the third impedance element comprises a resistor.

10. The light source driving circuit as claimed in claim 3, wherein the feedback circuit further comprises:
an output voltage feedback circuit, connected between the output terminal of the power supply circuit and the feedback terminal of the power supply circuit for determining the voltage value of the feedback signal according to the second voltage.

11. The light source driving circuit as claimed in claim 10, wherein the output voltage feedback circuit comprises:
a fourth impedance element, comprising a terminal connected to the output terminal of the power supply circuit and another terminal thereof connected to the feedback terminal of the power supply circuit; and
a fifth element, wherein a terminal of the fifth impedance element is connected to the another terminal of the fourth impedance element and the other terminal is connected to the common potential.

12. The light source driving circuit as claimed in claim 1, further comprising:
a timing control circuit, connected to the pulse width signal input terminal of the first dimming circuit for converting a luminance setting input by a user into the pulse width signal.

13. The light source driving circuit as claimed in claim 12, further comprising:
a level raising circuit, connected between the timing control circuit and the pulse width input terminal of the first dimming circuit for receiving the pulse width signal output from the timing control circuit, raising a voltage level of the pulse width signal and outputting the pulse width signal.

14. The light source driving circuit as claimed in claim 1, wherein the first light-emitting element is an LED, which has an anode connected to the first voltage.

15. The light source driving circuit as claimed in claim 1, wherein the first light-emitting element comprises a plurality of LEDs strung together anode to cathode and an anode of the first LED is connected to the first voltage.

16. The light source driving circuit as claimed in claim 1, for driving a second light-emitting element, a terminal of the second light-emitting element is connected to the first voltage, and the first dimming circuit further comprises a third terminal connected to the other terminal of the second light-emitting element, and the first dimming circuit determines an ON/OFF state between the third terminal and the second terminal according to the logic state of the pulse width signal.

17. The light source driving circuit as claimed in claim 1, for driving a second light-emitting element, a terminal of the second light-emitting element is connected to the first voltage, the light source driving circuit further comprising:
a second dimming circuit, comprising a first terminal connected to the another terminal of the second light-emitting element, a second terminal connected to the common potential and a pulse width signal input terminal connected to the pulse width signal input terminal of the first dimming circuit, so as to determine an ON/OFF state between the first terminal and the second terminal according to the logic state of the pulse width signal.

18. The light source driving circuit as claimed in claim 17, wherein the feedback circuit comprises:
a first detecting circuit, having a first terminal, a second terminal and an output terminal, wherein the first terminal is connected to the first terminal of the first dimming circuit, and the second terminal is connected to the common potential, so as to determine a level of the voltage output from the output terminal of the first detecting circuit according to an impedance between the first terminal of the first detecting circuit and the second terminal of the first detecting circuit;
a second detecting circuit, having a first terminal, a second terminal and an output terminal, wherein the first terminal is connected to the first terminal of the second dimming circuit and the second terminal is connected to the common potential, so as to determine a level of the voltage output from the output terminal of the second detecting circuit according to an impedance between the first terminal of the second detecting circuit and the second terminal of the second detecting circuit; and
a feedback voltage control circuit, comprising an input connected to the output terminals of the first detecting circuit and the second detecting circuit, and an output terminal for outputting the feedback signal, so as to control the voltage value of the feedback signal according to the levels of the voltages output from the output terminals of the first detecting circuit and the second detecting circuit.

19. The light source driving circuit as claimed in claim 18, wherein the first detecting circuit and the second detecting circuit respectively comprises:
a first impedance element, comprising a terminal serving as the first terminal of the first detecting circuit;
a second impedance element, comprising a terminal connected to the another terminal of the first impedance element and another terminal thereof connected to the common potential;
a first diode, comprising an anode connected to the another terminal of the first impedance element and a cathode connected to the output terminal of the first detecting circuit;
a third impedance element, comprising a terminal serving as the first terminal of the second detecting circuit;
a fourth impedance element, comprising a terminal connected to the another terminal of the third impedance element and another terminal thereof connected to the common potential; and
a second diode, comprising an anode connected to the another terminal of the third impedance element and a cathode connected to the output terminal of the second detecting circuit.

20. The light source driving circuit as claimed in claim 19, wherein the first impedance element, the second impedance element, the third impedance element and the fourth impedance element respectively comprise a resistor.

21. The light source driving circuit as claimed in claim 18, wherein the feedback voltage control circuit comprises:
   an operational amplifier, having a first input terminal, a second input terminal, and an output terminal, wherein the first input terminal is connected to the output terminal of the first detecting circuit and the output terminal of the second detecting circuit, the second input terminal is connected to a reference voltage, and the output terminal is connected to the feedback terminal of the power supply circuit.

22. The light source driving circuit as claimed in claim 21, wherein the feedback voltage control circuit further comprises:
   a third diode, comprising a cathode connected to the output terminal of the operational amplifier and an anode connected to the feedback terminal of the power supply circuit.

23. The light source driving circuit as claimed in claim 22, wherein the feedback voltage control circuit further comprises:
   a fifth impedance element, connected between the cathode of the third diode and the output terminal of the operational amplifier.

24. The light source driving circuit as claimed in claim 23, wherein the fifth impedance element comprises a resistor.

25. The light source driving circuit as claimed in claim 18, wherein the feedback circuit further comprises:
   an output voltage feedback circuit, connected between the output terminal of the power supply circuit and the feedback terminal of the power supply circuit for determining the voltage value of the feedback signal according to the second voltage.

26. The light source driving circuit as claimed in claim 25, wherein the output voltage feedback circuit comprises:
   a sixth impedance element, wherein a terminal of the sixth impedance element is connected to the output terminal of the power supply circuit and another terminal is connected to the feedback terminal of the power supply circuit; and
   a seventh impedance element, comprising a terminal connected to the another terminal of the sixth impedance element and another terminal thereof connected to the common potential.

27. The light source driving circuit as claimed in claim 17, wherein the second light-emitting element is an LED, which has an anode connected to the first voltage.

28. The light source driving circuit as claimed in claim 17, wherein the second light-emitting element is a plurality of LEDs strung together anode to cathode, and an anode of the first LED is connected to the first voltage.

* * * * *